United States Patent
Wang et al.

(10) Patent No.: US 10,834,374 B2
(45) Date of Patent: Nov. 10, 2020

(54) METHOD, APPARATUS, AND DEVICE FOR SYNTHESIZING VIRTUAL VIEWPOINT IMAGES

(71) Applicant: PEKING UNIVERSITY SHENZHEN GRADUATE SCHOOL, Shenzhen (CN)

(72) Inventors: Ronggang Wang, Shenzhen (CN); Xiubao Jiang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/553,948

(22) Filed: Aug. 28, 2019

(65) Prior Publication Data

US 2019/0387210 A1    Dec. 19, 2019

Related U.S. Application Data

(63) Continuation-in-part of application No. 16/489,209, filed as application No. PCT/CN2017/097358 on Aug. 14, 2017.

(30) Foreign Application Priority Data

Feb. 28, 2017    (CN) .......................... 2017 1 0113048

(51) Int. Cl.
    *H04N 13/128*    (2018.01)
    *G06T 7/593*     (2017.01)
    *G06T 7/194*     (2017.01)

(52) U.S. Cl.
    CPC ........... *H04N 13/128* (2018.05); *G06T 7/194* (2017.01); *G06T 7/593* (2017.01); *G06T 2207/10012* (2013.01); *G06T 2207/20221* (2013.01)

(58) Field of Classification Search
    CPC ........ G06T 7/194; G06T 7/593; H04N 13/128
    See application file for complete search history.

(56) References Cited

U.S. PATENT DOCUMENTS 8,737,723 B1    5/2014  Kwatra
9,838,663 B2    12/2017 Li et al.
(Continued)

FOREIGN PATENT DOCUMENTS

CN    101720047 A    6/2010
CN    104574342 A    4/2015
(Continued)

OTHER PUBLICATIONS

Zhu, et. al., Reliability Fusion of Time-of-Flight Depth and Stereo Geometry for High Quality Depth Maps, Jul. 2011, IEEE Transactions on Pattern Analysis and Machine Intelligence, vol. 33, No. 7, pp. 1400-1413 (Year: 2011).*
(Continued)

*Primary Examiner* — Francis Geroleo
*Assistant Examiner* — Christopher Kingsbury Glover
(74) *Attorney, Agent, or Firm* — Miles & Stockbridge P.C.

(57)    ABSTRACT

The disclosure is directed to methods, apparatuses, and devices for synthesizing virtual viewpoint images that are configured for acquiring an original image set, performing stereo matching to original images to obtain a first disparity map set, performing optimization processing to each first disparity map in the first disparity map set to obtain a second disparity map set, determining whether each second disparity map in the second disparity map set has a third disparity map with deep tomography to obtain a first determination result, if the first determination result indicates existence of the third disparity map, segmenting a portion with deep tomography to obtain a corresponding foreground disparity
(Continued)

map and a corresponding background disparity map, mapping the second disparity map without deep tomography, the foreground disparity map, the background disparity map, and the portion without deep tomography in the third disparity map according to a first virtual viewpoint to obtain a first virtual viewpoint image set, and fusing first virtual viewpoint images to obtain a to-be-synthesized viewpoint image. Adoption of the methods, apparatuses, and devices for synthesizing virtual viewpoint images enhances synthesis accuracy and improves the user viewing experience.

16 Claims, 3 Drawing Sheets

(56) References Cited

U.S. PATENT DOCUMENTS

| | | |
|---|---|---|
| 2005/0232510 A1 | 10/2005 | Blake et al. |
| 2011/0285813 A1 | 11/2011 | Girdzijauskas et al. |
| 2012/0120185 A1 | 5/2012 | Zhao et al. |
| 2012/0206442 A1 | 8/2012 | Tian et al. |
| 2012/0249750 A1 | 10/2012 | Izzat et al. |
| 2014/0270706 A1 | 9/2014 | Pasko |
| 2015/0043636 A1 | 2/2015 | Jung et al. |
| 2015/0178936 A1* | 6/2015 | Boisson ............... H04N 13/271 |
| | | 382/154 |
| 2018/0091798 A1 | 3/2018 | Chang et al. |
| 2020/0162719 A1* | 5/2020 | Tadi ....................... G06T 7/0012 |

FOREIGN PATENT DOCUMENTS

| | | |
|---|---|---|
| CN | 104756489 A | 7/2015 |
| CN | 106210696 A | 12/2016 |
| EP | 2860695 A1 | 4/2015 |

OTHER PUBLICATIONS

Any information that are not included with this Information Disclosure Statement can be found in U.S. Appl. No. 16/489,209.

* cited by examiner

METHOD, APPARATUS, AND DEVICE FOR SYNTHESIZING VIRTUAL VIEWPOINT IMAGES

CROSS-REFERENCE TO RELATED APPLICATIONS

This application is a Continuation-in-Part of U.S. patent application Ser. No. 16/489,209 filed on Aug. 27, 2019, which claims the benefit to national stage filing under 35 U.S.C. § 371 of PCT/CN2017/097358, filed on Aug. 14, 2017 which claims priority to CN Application No. 201710113048.7 filed on Feb. 28, 2017. The applications are incorporated herein by reference in their entirety.

FIELD

Embodiments of the present disclosure generally relate to the field of computer technologies, and more particularly relate to a method, an apparatus, and a device for synthesizing virtual viewpoint images.

BACKGROUND

With advancement of technologies, naked-eye three-dimensional (3D) technology and virtual reality technologies have become popular in a wider range. Compared with conventional media, these novel media may provide stronger immersion and experience to users.

However, the development of devices for acquiring the novel media does not catch up with that of novel media technologies. With the naked eye 3D technology as an example, the naked eye 3D TVs on the market generally require multiple channels (8/9/27/64) of viewpoint inputs. However, the number of channels for actual viewpoint inputs is less than the required number of channels. In the case of less channels of actual viewpoint inputs, existing real viewpoints need to be extended so as to capture naked eye 3D contents, e.g., synthesizing the contents captured by two channels of stereo cameras into an 8-channel video stream. This technology of synthesizing virtual viewpoint images based on contents of known viewpoints and depth information of the scene is referred to as the virtual viewpoint synthesis technology.

The conventional virtual viewpoint synthesis technologies generally perform synthesis based on depth maps, such that they are largely dependent on the depth maps; besides, they offer a low synthesis accuracy, which affects users' viewing experience.

SUMMARY

Embodiments of the present disclosure provide a method, apparatus, and device for synthesizing virtual viewpoint images so as to overcome the problems of the prior art that the conventional virtual viewpoint synthesis technologies have a large dependency on depth maps, a low synthesis accuracy, and a deteriorated viewing experience for users.

An embodiment of the present disclosure provides a method for synthesizing virtual viewpoint images, comprising: acquiring an original image set; performing stereo matching between original images in the original image set and prestored images to obtain a first disparity map set; performing optimization processing to each first disparity map in the first disparity map set according to a preset optimization rule to obtain a second disparity map set; determining whether each second disparity map in the second disparity map set has a third disparity map with deep tomography to obtain a first determination result; if the first determination result indicates existence of the third disparity map, segmenting a portion with deep tomography in the third disparity map to obtain a foreground disparity map and a background disparity map which correspond to the portion with deep tomography in the third disparity map; mapping the second disparity map without deep tomography, the foreground disparity map, the background disparity map, and the portion without deep tomography in the third disparity map according to a first virtual viewpoint to obtain a first virtual viewpoint image set; and fusing first virtual viewpoint images in the first virtual viewpoint image set to obtain a to-be-synthesized viewpoint image.

An embodiment of the present disclosure provides an apparatus for synthesizing virtual viewpoint images, comprising: an acquiring module configured for acquiring an original image set; a matching module configured for performing stereo matching between original images in the original image set and prestored images to obtain a first disparity map set; an optimizing module configured for performing optimization processing to each first disparity map in the first disparity map set according to a preset optimization rule to obtain a second disparity map set; a determining module configured for determining whether each second disparity map in the second disparity map set has a third disparity map with deep tomography to obtain a first determination result; a segmenting module configured for: if the first determination result indicates existence of the third disparity map, segmenting a portion with deep tomography in the third disparity map to obtain a foreground disparity map and a background disparity map which correspond to the portion with deep tomography in the third disparity map; a mapping module configured for mapping, as first virtual viewpoints, the second disparity map without deep tomography, the foreground disparity map, the background disparity map, and the portion without deep tomography in the third disparity map to obtain a first virtual viewpoint image set; and a fusing module configured for fusing first virtual viewpoint images in the first virtual viewpoint image set to obtain a to-be-synthesized viewpoint image.

An embodiment of the present disclosure provides a device for synthesizing virtual viewpoint images, comprising: at least one processor; and a memory in communication connection with the at least one processor; wherein, the memory stores an instruction that may be executed by the at least one processor; and the instruction is executed by the at least one processor, such that the at least one processor is capable of implementing the method for synthesizing virtual viewpoint images.

An embodiment of the present disclosure provides a computer readable memory medium on which an instruction is stored, wherein the instruction, when being executed, carries out the steps of the method for synthesizing virtual viewpoint images.

By first subjecting the original image set to stereo matching processing to obtain disparity maps corresponding to the original image set, subjecting the disparity maps to optimization processing, then determining whether the optimized disparity maps have deep tomography, and next correspondingly processing the determination result to finally obtain the to-be-synthesized viewpoint image, the technical solutions above offer a less dependency on depth maps, a high synthesis accuracy, and a better user viewing experience.

BRIEF DESCRIPTION OF THE DRAWINGS

The drawings illustrated here are used for providing further understanding of the present disclosure, which constitute part of the present disclosure. The exemplary embodiments of the present disclosure and their explanations are used for explaining the present disclosure, which do not constitute improper limitation of the present disclosure. In the drawings.

DETAILED DESCRIPTION OF EMBODIMENTS

To make the objects, technical solutions, and advantages of the present disclosure much clearer, the technical solutions of the present disclosure will be described clearly and sufficiently with reference to the embodiments and corresponding drawings of the present disclosure. Apparently, the embodiments described herein are only part of the embodiments of the present disclosure, not all of them. All other embodiments obtained by those skilled in the art without exercise of inventive work based on the embodiments in the present disclosure shall fall within the protection scope of the present disclosure.

Figure 1:
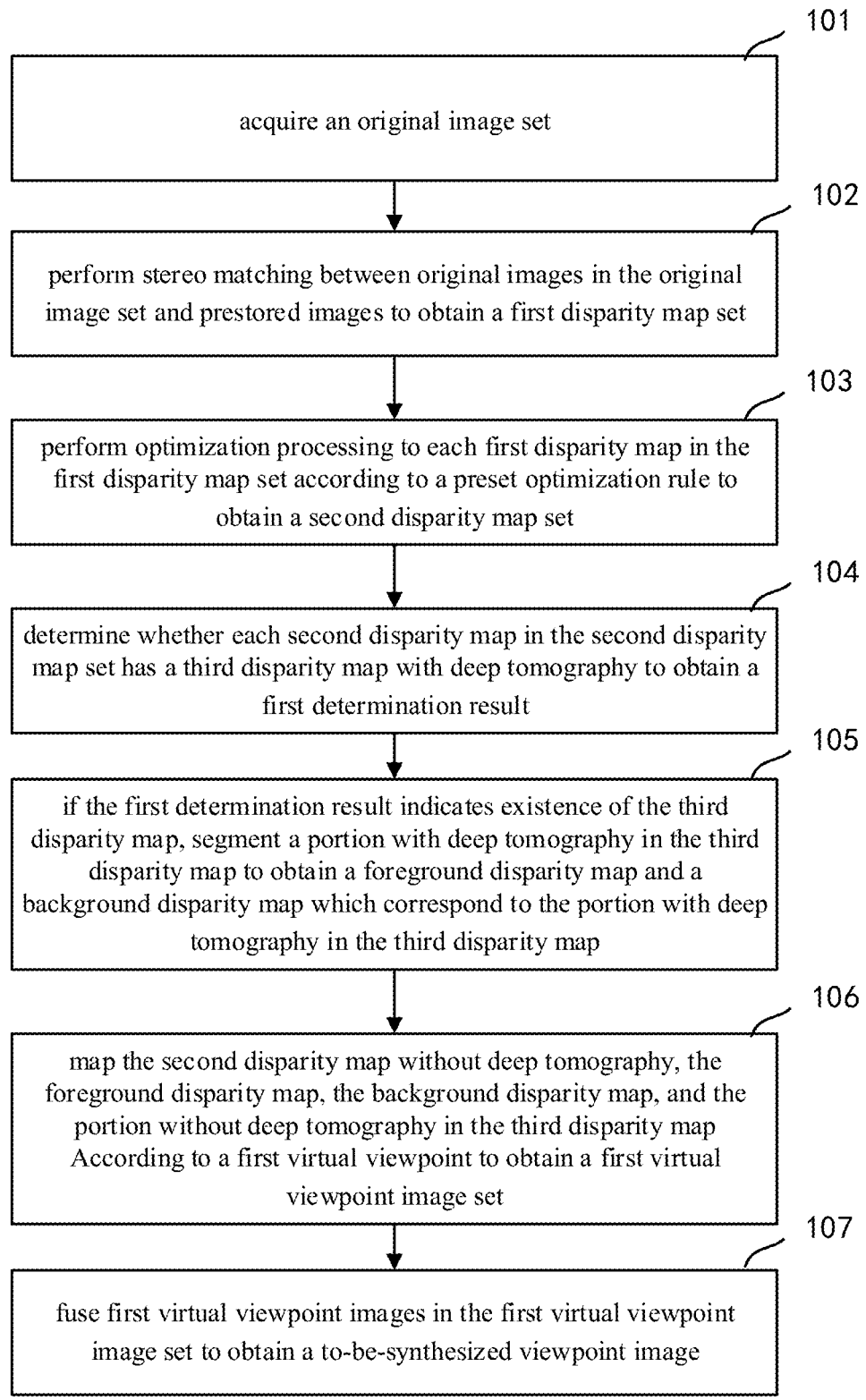
FIG. 1 shows a flow diagram of a method for synthesizing virtual viewpoint images according to an embodiment of the present disclosure.

FIG. 1 shows a flow diagram of a method for synthesizing virtual viewpoint images according to an embodiment of the present disclosure, which specifically may comprise the following steps:

Step 101: acquiring an original image set.

The original image set may refer to images captured by an image capturing device (e.g., a camera). The number of original images in the original image set is better larger than one, preferably two or above.

Step 102: performing stereo matching between original images in the original image set and prestored images to obtain a first disparity map set.

A stereo matching algorithm is utilized to perform stereo matching between the original images in the original image set and the prestored images to obtain first disparity maps corresponding to the original images in the original image set, wherein a plurality of first disparity maps constitute a first disparity map set. Particularly, a disparity map refers to any image taken from an original image—prestored image pair as reference, whose size is the size of the reference image and whose element value is a disparity value.

Step 103: performing optimization processing to each first disparity map in the first disparity map set according to a preset optimization rule to obtain a second disparity map set.

Step 104: determining whether each second disparity map in the second disparity map set has a third disparity map with deep tomography to obtain a first determination result.

Because a content with deep tomography will cause occlusion on a newly synthesized viewpoint, it is needed to segment the content for separate mapping. Before determining whether the second disparity map has deep tomography, optimization processing should be further conducted to the first disparity maps so as to obtain corresponding second disparity maps, all of the second display maps constituting a second disparity map set. By subjecting the each first disparity map to optimization processing, the first disparity map may be segmented into a regular area according to a preset rule, and then processing is made to the regular area; in this way, the number of times of determining whether the deep tomography exists may be reduced and the efficiency of determining whether each second disparity map in the second disparity map set has deep tomography may be enhanced. Moreover, the size of the segmented area is larger than the original pixel size, which facilitates subsequence processing of the determination on whether deep tomography exists.

Step 105: if the first determination result indicates existence of the third disparity map, segmenting a portion with deep tomography in the third disparity map to obtain a foreground disparity map and a background disparity map which correspond to the portion with deep tomography in the third disparity map.

For the portion with deep tomography in the third disparity map, it may be segmented by "lateral segmentation," "longitudinal segmentation," or "diagonal segmentation" (collectively referred to as "segmentation type"). A start node and an end node of the cutting line for segmentation are determined based on the segmentation type, wherein the start node is located on a start edge and the end node is located on an end edge. Then the portion with deep tomography is segmented based on the determined start node and end node of the cutting line. The determined start node and end node of the cutting line for segmentation may be used for seeking the shortest path from the start node to the end node on the mesh. Particularly, the shortest path from the start edge to the end edge may be sought through a dynamic planning algorithm.

Step 106: mapping, the second disparity map without deep tomography, the foreground disparity map, the background disparity map, and the portion without deep tomography in the third disparity map according to a first virtual viewpoint to obtain a first virtual viewpoint image set.

After the portion with deep tomography in the third disparity map is segmented, a foreground disparity map and a background disparity map which correspond to the portion with deep tomography are obtained; then, the second disparity map without deep tomography, the foreground disparity map, the background disparity map, and the portion without deep tomography in the third disparity map are mapped according to the first virtual viewpoint, respectively, to obtain two types of first virtual viewpoint image sets. The first type refers to a first virtual viewpoint image mapped from the second disparity map without deep tomography. The second type refers to a first virtual viewpoint image which is mapped jointly from the foreground disparity map obtained by segmenting the portion with deep tomography in the third disparity map, the background disparity map obtained by segmenting the portion with deep tomography in the third disparity map, and the portion without deep tomography in the third disparity map. Then, the first virtual viewpoint images of the two types constitute the first virtual viewpoint image set.

Step 107: fusing first virtual viewpoint images in the first virtual viewpoint image set to obtain a to-be-synthesized viewpoint image.

The first virtual viewpoint images of the two types are fused to obtain the to-be-synthesized viewpoint image. Besides, the obtained to-be-synthesized viewpoint image needs to maintain a disparity cache zone. Namely, at each pixel position, a disparity corresponding to the pixel mapped to the position needs to be recorded, and a pixel with a higher disparity value may replace the original pixel with a lower disparity value.

By first subjecting the original image set to stereo matching processing to obtain disparity maps corresponding to the original image set, subjecting the disparity maps to optimization processing, then determining whether the optimized disparity maps have deep tomography, and next correspondingly processing the determination result to finally obtain the to-be-synthesized viewpoint image, the technical solution above offers a less dependency on depth maps, a high synthesis accuracy, and a better user viewing experience.

Besides, in a preferred embodiment, the performing stereo matching between original images and prestored images to obtain a first disparity map set may specifically comprise: performing stereo matching between original images in the original image set and the prestored images according to a stereo matching algorithm to obtain a first initial disparity map set.

Particularly, the stereo matching algorithm may be SGM (Semi Global Matching). By adopting SGM to perform stereo matching between the original images in the original image set and prestored images, a first disparity map set is obtained.

Pixels in each first initial disparity map in the first initial disparity map set according to a consistency inspection algorithm are subjected to a consistency inspection to obtain an inspection result. Each pixel in the each first initial disparity map is subjected to labeling processing based on the inspection result to obtain a labeled first disparity map set, wherein the label refers to a consistency label, an inconsistency label, or an occlusion label.

Pixels in each first initial disparity map in the first initial disparity map set are subjected to consistency inspection according to the consistency inspection algorithm to obtain an inspection result, wherein the disparity at each pixel position is correspondingly labeled as "consistency," "inconsistency," and "occlusion." Besides, the disparity labeled as "occlusion" may be replaced with a surrounding background disparity.

Further, in a preferred embodiment, the performing optimization processing to each first disparity map in the first disparity map set according to a preset optimization rule to obtain a second disparity map set specifically may comprise: performing meshing processing to each first disparity map in the first disparity map set according to a preset partition rule to obtain a meshed second initial disparity map set; determining, based on the label carried by the pixel in each mesh in each second initial disparity map in the second initial disparity map set, disparity information of each mesh using a corresponding algorithm; and adding the disparity information of the each mesh to corresponding meshes in the each second initial disparity map to thereby obtain a second disparity map set.

The first disparity map is segmented into a regular mesh according to a preset partition rule. Particularly, the partition rule may also be set according to actual needs, e.g., the first disparity map may be segmented into a 10*10 grid or an 8*9 grid. Color information surrounding each lattice point may also be recorded using a LAB color histogram, and the disparity information of each mesh is determined using a corresponding algorithm based on the recorded histogram and the label carried by the pixel in each mesh.

Further, in a preferred embodiment, the determining whether each second disparity map in the second disparity map set has a third disparity map with deep tomography to obtain a first determination result specifically may comprise: determining whether the mesh in each second disparity map in the second disparity map set has a third disparity map with deep tomography to obtain a first determination result.

After the meshing partition is completed, whether deep tomography exists in the mesh may be determined based on the disparity information of each mesh, wherein the disparity map where the mesh with deep tomography is located is referred to as a third disparity map.

The segmenting a portion with deep tomography in the third disparity map to obtain a foreground disparity map and a background disparity map which correspond to the portion with deep tomography in the third disparity map if the first determination result indicates existence of the third disparity map may specifically comprise:

if the first determination result indicates existence of the third disparity map, segmenting the mesh with deep tomography in the third disparity map to obtain a foreground disparity map which corresponds to the mesh with deep tomography and a background disparity map which corresponds to the mesh with deep tomography in the third disparity map; and the mapping, the second disparity map without deep tomography, the foreground disparity map, the background disparity map, and the portion without deep tomography in the third disparity map according to a first virtual viewpoint to obtain a first virtual viewpoint image set specifically comprises:

mapping the second disparity map without deep tomography, the foreground disparity map which corresponds to the mesh with deep tomography, the background disparity map which corresponds to the mesh with deep tomography, and the mesh without deep tomography in the third disparity map according to the first virtual viewpoint to obtain a first virtual viewpoint image set.

After the mesh with deep tomography in the third disparity map is segmented, a foreground disparity map and a background disparity map which correspond to the portion with deep tomography are obtained; then, the second disparity map without deep tomography, the foreground disparity map, the background disparity map, and the mesh without deep tomography in the third disparity map are mapped according to the first virtual viewpoint, respectively, to obtain two types of first virtual viewpoint image sets. The first type refers to a first virtual viewpoint image mapped from the second disparity map without deep tomography. The second type refers to a first virtual viewpoint image which is mapped jointly from the foreground disparity map obtained by segmenting the mesh with deep tomography in the third disparity map, the background disparity map obtained by segmenting the mesh with deep tomography in the third disparity map, and the mesh without deep tomography in the third disparity map. Then, the first virtual viewpoint images of the two types constitute a first virtual viewpoint image set.

Further, in a preferred embodiment, the method may further comprise: if the first determination result indicates absence of the third disparity map, mapping the each second disparity map according to a second virtual viewpoint to obtain a second virtual viewpoint map set; and fusing the second virtual viewpoint images in the second virtual viewpoint image set to obtain a to-be-synthesized viewpoint image.

Particularly, the second virtual viewpoint may be identical to the first virtual viewpoint. Namely, regardless of whether a disparity map has a portion with or without deep tomography, it is still mapped according to the same virtual viewpoint to obtain a virtual viewpoint image set, and then the virtual viewpoint images in the virtual viewpoint image set are fused to obtain a to-be-synthesized viewpoint image.

Further, the second virtual viewpoint may be different from the first virtual viewpoint, i.e., the disparity map with deep tomography and the disparity map without deep tomography may be mapped according to different virtual viewpoints to obtain a virtual viewpoint image set; then the virtual viewpoint images in the virtual viewpoint image set are fused to obtain a to-be-synthesized viewpoint image.

Further, in a preferred embodiment, the determining, based on the label carried by the pixel in each mesh in each second initial disparity map in the second initial disparity map set, disparity information of each mesh using a corresponding algorithm may specifically comprise:

if the number of pixels carrying the consistency label within a preset scope outside the first target mesh exceeds a preset threshold, performing fitting processing to the first target mesh according to a plane fitting algorithm to obtain disparity information of the first target mesh;

if the number of pixels carrying the consistency label within a preset scope outside the second target mesh does not exceed the preset threshold, determining a third target mesh with the minimum-cost path to the second target mesh according to a dynamic planning algorithm, wherein the disparity information of the third target mesh is set as disparity information of the second target mesh.

Particularly, for the first target mesh (p,q), the size of the outer perimeter of the first target mesh is the number of all pixels carrying the consistency label inside the window $\Delta_x \times \Delta_y$. If the number of pixels carrying the consistency label does not have a preset threshold, plane fitting is performed according to the following expression:

$$\pi(x,y) = \pi_a x + \pi_b y + \pi_c;$$

where $\pi_a$, $\pi_b$, $\pi_c$ are coefficients of to-be-fitted planes.

The disparity information disp(p,q) of the first target mesh is calculated based on a plane fitting expression below:

disp(p,q)=$\pi_a \Delta_x p + \pi_b \Delta_y q + \pi_c$, wherein p and q are two neighboring nodes on the path. The disparity information disp(p,q) is the disparity value of the mesh.

If the number of pixels carrying the consistency label within a preset scope outside the second target mesh does not exceed the preset threshold, LAB color information (LAB is a color space) in the window $\Delta_x \times \Delta_y$ outside the second target mesh is collected to build a histogram. Let the position of the second target mesh be denoted as $N_s$, and for all "reliable" lattice points $\{N_T^1, N_T^2 \ldots N_T^k\}$ within their surrounding W/6×H/6 range, path costs from $N_s$ to $\{N_T^1, N_T^2 \ldots N_T^k\}$ are calculated using a dynamic planning algorithm, wherein the cost expression for the path between two neighboring grid points is:

$$\tilde{C}(N_S \to N_T^j) = \min_{\gamma \in \text{all paths connecting } N_S \text{ and } N_T^j} C(N_S \xrightarrow{\gamma} N_T^j)$$

$$C(N_S \xrightarrow{\gamma} N_T^j) = \sum_{i=1}^{|\gamma|-1} d(H_{Lab}(\gamma(i)), H_{Lab}(\gamma(i+1)));$$

where d(.,.) denotes the $\chi^2$ distance between two LAB histograms; $\gamma$ represents a mesh through which a path passes, C(.,.) denotes a cost of path between two meshes, $\tilde{C}$(.,.) denotes a minimum cost of all paths between two meshes.

Further, in a preferred embodiment, the determining whether each second disparity map in the second disparity map set has a third disparity map with deep tomography to obtain a first determination result specifically may comprise:

determining disparity information of meshes at four outer corner points of any mesh in the second disparity map based on the disparity information of each mesh in the second disparity map; and determining whether a third disparity map with a deep tomographic mesh exists based on the disparity information of the meshes at the four outer corner points to obtain a first determining result.

For a rectangular mesh Q(p,q), the disparity values $\{d_1, d_2, d_3, d_4\}$ on the four corner points are divided into subsets $S_1, S_2, S_k$ according to the following expressions:
for any $d_i, d_j \in S_k$, $|d_i - d_j| \leq 1$
for any $d_i \in S_k, d_j \notin S_k, |d_i - d_j| > 1$;

where N denotes the total number of divided subsets; if N=1, it indicates that the mesh does not have deep tomography, such that it needn't be segmented. If N=2, it indicates that the mesh has deep tomography, such that it needs to be segmented. If N≥3, it indicates that the disparities of the corner points of the current grid are not consistent, such that the current mesh is discarded. In the case of N=2, we may further segment the mesh by "lateral segmentation," "longitudinal segmentation," or "diagonal segmentation" based on disparity distribution of the corner points.

With the "lateral segmentation" as an example, the left and right vertical edges in the mesh are respectively denoted as the start edge and the end edge, respectively, such that the issue of seeking the cutting line may be converted to solving a path with the minimum cost among all paths from a certain node on the start node to a certain node on the end node, wherein the cost between two nodes p, q on the path is defined as an edge strength on point p.

For a rectangular mesh having deep tomography inside, it may be directly mapped onto the virtual viewpoint based on the disparity information on its corner points. For a rectangular mesh having deep tomography inside, it may be divided into two portions along the cutting line and then the two portions as foreground and background disparities are respectively mapped to the virtual viewpoints. The occluded pixels may also be eliminated using a disparity cache area.

Supposing there are two pieces of original images in a specific embodiment, from which two left and right disparity maps $I_L$ and $I_R$ are respectively obtained; after performing viewpoint mapping to the left and right disparity maps $I_L$ and $I_R$, the obtained virtual viewpoint images need to be fused according to the following expression to thereby obtain the final synthesized viewpoint $I_M$:

$I_M = (1-\alpha) I_L^\alpha + \alpha I_R^\alpha$ where $0 < \alpha < 1$ denotes the normalized distance from the virtual viewpoint to the left viewpoint $I_L$; $I_M$ denotes the final to-be-synthesized viewpoint image; $I_L^\alpha$, $I_R^\alpha$ are images obtained by mapping $I_L$ and $I_R$ to the virtual viewpoint position.

By adopting the above solution, the present disclosure has a relatively strong robustness to errors in the scene depth information; as such, it may be guaranteed that the subjective quality of viewpoint synthesis will not be significantly deteriorated when the depth map has a relatively serious fault, and the geometrical information of the scene may be maintained to the utmost extent so as to create a vivid immersion; the present disclosure ameliorates the drawbacks of the conventional methods that the synthesis quality is significantly deteriorated when the scene depth information has errors and noises; as such the present disclosure has a strong robustness to the errors in the scene depth map information; by segmenting the local area with deep tomography in the image using the scene depth and color information, the occlusion issue in virtual viewpoint synthesis is solved.

Figure 2:
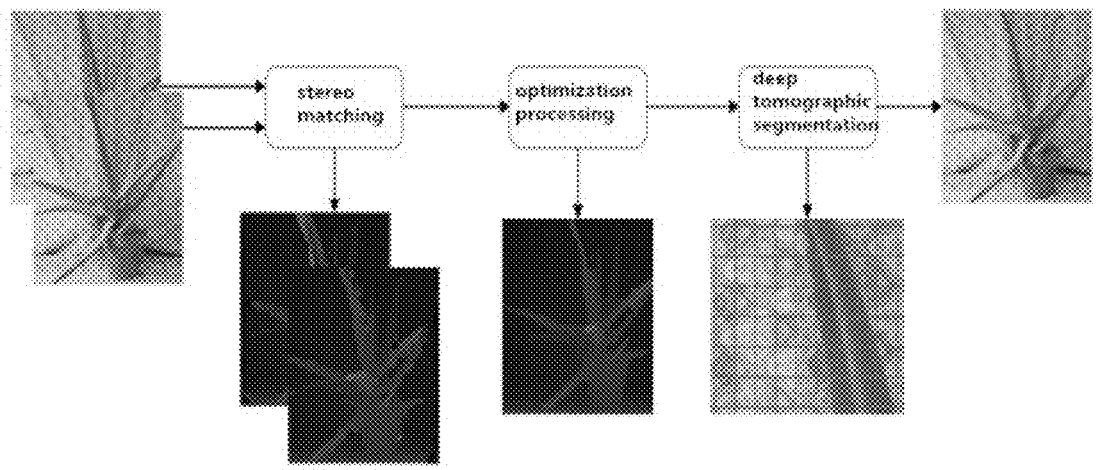
FIG. 2 shows an application diagram of the method for synthesizing virtual viewpoint images according to an embodiment of the present disclosure.

FIG. 2 shows an application schematic diagram of synthesizing virtual viewpoint images according to an embodiment of the present disclosure, which may specifically comprise: the input left and right images constituting an original image set in a MiddleBury stereo match dataset, first performing stereo matching to the original images in the original image set to obtain initial disparity maps; then performing optimization processing to the initial disparity maps to obtain meshed disparity maps; next, segmenting all meshes with deep tomography to obtain corresponding foreground disparity maps and background disparity maps; then mapping the processed disparity maps as virtual viewpoints to obtain a virtual viewpoint image set; finally, fusing the virtual viewpoint images in the virtual viewpoint image set to obtain a to-be-synthesized viewpoint image.

Based on the same idea, an embodiment of the present disclosure further provides an apparatus corresponding to the method.

Figure 3:
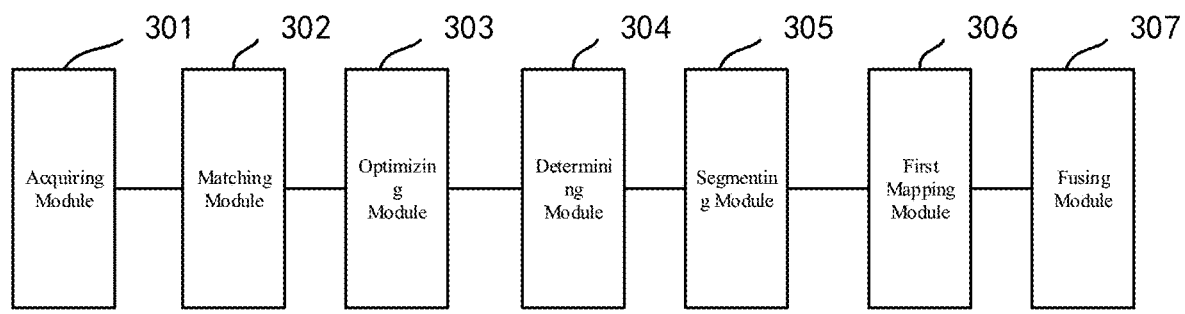
FIG. 3 shows a structural diagram of an apparatus for synthesizing virtual viewpoint images corresponding to FIG. 1 according to an embodiment of the present disclosure.

FIG. 3 shows a structural diagram of an apparatus for synthesizing virtual viewpoint images corresponding to FIG. 1 according to an embodiment of the present disclosure. As shown in FIG. 3, the apparatus may comprise:

an acquiring module 301 configured for acquiring an original image set;

a matching module 302 configured for performing stereo matching between original images in the original image set and prestored images to obtain a first disparity map set;

an optimizing module 303 configured for performing optimization processing to each first disparity map in the first disparity map set according to a preset optimization rule to obtain a second disparity map set;

a determining module 304 configured for determining whether each second disparity map in the second disparity map set has a third disparity map with deep tomography to obtain a first determination result;

a segmenting module 305 configured for: if the first determination result indicates existence of the third disparity map, segmenting a portion with deep tomography in the third disparity map to obtain a foreground disparity map and a background disparity map which correspond to the portion with deep tomography in the third disparity map;

a first mapping module 306 configured for mapping, as first virtual viewpoints, the second disparity map without deep tomography, the foreground disparity map, the background disparity map, and the portion without deep tomography in the third disparity map to obtain a first virtual viewpoint image set; and a fusing module 307 configured for fusing first virtual viewpoint images in the first virtual viewpoint image set to obtain a to-be-synthesized viewpoint image.

By first subjecting the original image set to stereo matching processing to obtain disparity maps corresponding to the original image set, subjecting the disparity maps to optimization processing, then determining whether the optimized disparity maps have deep tomography, and next correspondingly processing the determination result to finally obtain the to-be-synthesized viewpoint image, the apparatus in FIG. 3 offers a less dependency on depth maps, a high synthesis accuracy, and a better user viewing experience.

In a preferred embodiment, the matching module may specifically comprise: a first stereo matching unit configured for performing stereo matching between the original images in the original image set and the prestored images according to a stereo matching algorithm to obtain a first initial disparity map set; a consistency inspection unit configured for performing consistency inspection to pixels in each first initial disparity map in the first initial disparity map set according to a consistency inspection algorithm to obtain an inspection result; and a first labeling unit configured for performing labeling processing to each pixel in the each first initial disparity map based on the inspection result to obtain a labeled first disparity map set, wherein the label refers to a consistency label, an inconsistency label, or an occlusion label.

In a preferred embodiment, the optimizing module may specifically comprise: a mesh partitioning unit configured for performing meshing processing to each first disparity map in the first disparity map set according to a preset partition rule to obtain a meshed second initial disparity map set; a disparity determining unit configured for determining disparity information of each mesh using a corresponding algorithm based on the label carried by the pixels in each mesh in each second initial disparity map in the second initial disparity map set; and an adding unit configured for adding the disparity information of the each mesh to the corresponding mesh in the each second initial disparity map to obtain a second disparity map set.

In a preferred embodiment, the determining module may specifically comprise:

a first determining unit configured for determining whether the mesh in each second disparity map in the second disparity map set has a third disparity map with deep tomography to obtain a first determination result;

a segmenting unit configured for: if the first determination result indicates existence of the third disparity map, segmenting a portion with deep tomography in the third disparity map to obtain a foreground disparity map and a background disparity map which correspond to the portion with deep tomography in the third disparity map, the segmenting unit specifically comprising:

a first mapping unit configured for if the first determination result indicates existence of the third disparity map, segmenting the mesh with deep tomography in the third disparity map to obtain a foreground disparity map which correspond to the mesh with deep tomography and a background disparity map which correspond to the mesh with deep tomography in the third disparity map.

The first mapping module may specifically comprise:

a second mapping unit configured for mapping, as first virtual viewpoints, the second disparity map without deep tomography, the foreground disparity map which corresponds to the mesh with deep tomography, the background disparity map which corresponds to the mesh with deep tomography, and the mesh without deep tomography in the third disparity map to obtain a first virtual viewpoint image set.

In a specific embodiment, the apparatus may further comprise: a second mapping module configured for: if the first determination result indicates absence of the third disparity map, mapping the each second disparity map according to a second virtual viewpoint to obtain a second virtual viewpoint map set; and a synthesizing module configured for fusing the second virtual viewpoint images in the second virtual viewpoint image set to obtain a to-be-synthesized viewpoint image.

In a preferred embodiment, the disparity determining unit may specifically comprise:

if the number of pixels carrying the consistency label within a preset scope outside the first target mesh exceeds a preset threshold, performing fitting processing to the first target mesh according to a plane fitting algorithm to obtain disparity information of the first target mesh.

if the number of pixels carrying the consistency label within a preset scope outside the second target mesh does not exceed the preset threshold, determining a third target mesh with the minimum path cost to the second target mesh according to a dynamic planning algorithm; and setting disparity information of the third target mesh as disparity information of the second target mesh.

In a preferred embodiment, the determining module may specifically comprise: a determining unit configured for determining, based on disparity information of each mesh in the second disparity map, disparity information of meshes at four outer corner points of any mesh in the second disparity map; and a second determining unit configured for determining, based on the disparity information of the meshes at the four outer corner points, whether a third disparity map with a deep tomographic mesh exists to obtain a first determining result.

Figure 4:
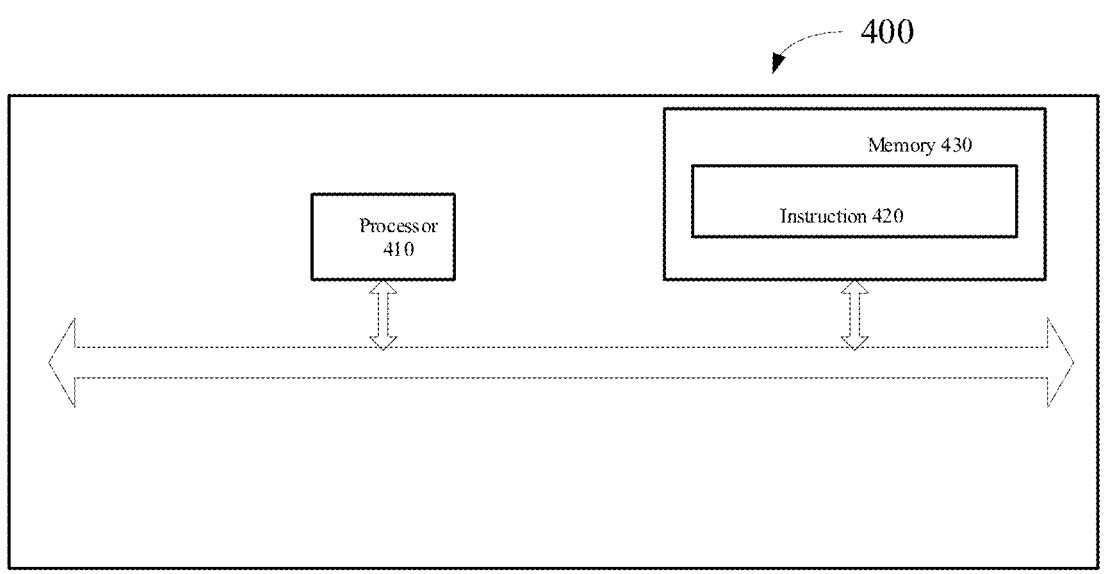
FIG. 4 shows a structural diagram of a device for synthesizing virtual viewpoint images corresponding to FIG. 1 according to an embodiment of the present disclosure.

FIG. 4 shows a structural diagram of a device for synthesizing virtual viewpoint images corresponding to FIG. 1 according to an embodiment of the present disclosure. As shown in FIG. 4, the device 400 may comprise:

at least one processor 401; and a memory 430 in communication connection with the at least one processor; wherein, the memory 430 stores an instruction 420 that may be executed by the at least one processor 410, the instruction being executed by the at least processor 410 such that the at least one processor 410 may implement the above embodiments of the method for synthesizing virtual viewpoints. Implementation of specific functions of the device 400 may refer to the explanations on the method embodiments above, which will not be detailed here.

Based on the same idea, an embodiment of the present disclosure further provides a computer readable memory medium on which an instruction is stored, wherein the instruction, when being executed, carries out the steps of the method for synthesizing virtual viewpoint images.

Additionally, other identical elements are also present. Those skilled in the art should understand that the embodiments of the present disclosure may be provided as a method, a system, or a computer program product. Therefore, the present disclosure may adopt a form of complete hardware embodiment, a complete software embodiment, or an embodiment combining software and hardware. Moreover, the present disclosure may adopt a form of a computer program product implemented on one or more computer-adaptable storage media including computer-adaptable program code (including, but not limited to, a magnetic disc memory, CD-ROM, and optical memory, etc.). What have been described above are only preferred embodiments of the present disclosure, not for limiting the present disclosure; to those skilled in the art, the present disclosure may have various alterations and changes. Any modifications, equivalent substitutions, and improvements within the spirit and principle of the present disclosure should be included within the protection scope of the present disclosure.

We claim:

1. A method for synthesizing virtual viewpoint images, comprising:

acquiring an original image set;

performing stereo matching between original images in the original image set and prestored images to obtain a first disparity map set;

performing optimization processing to each first disparity map in the first disparity map set according to a preset optimization rule to obtain a second disparity map set;

determining whether each second disparity map in the second disparity map set has a third disparity map with deep tomography to obtain a first determination result;

if the first determination result indicates existence of the third disparity map, segmenting a portion with deep tomography in the third disparity map to obtain a foreground disparity map and a background disparity map which correspond to the portion with deep tomography in the third disparity map;

mapping the second disparity map without deep tomography, the foreground disparity map, the background disparity map, and the portion without deep tomography in the third disparity map according to a first virtual viewpoint to obtain a first virtual viewpoint image set; and fusing first virtual viewpoint images in the first virtual viewpoint image set to obtain a to-be-synthesized viewpoint image.

2. The method according to claim 1, wherein the performing stereo matching between original images in the original image set and the prestored images to obtain a first disparity map set comprises:

performing stereo matching between original images in the original image set and the prestored images according to a stereo matching algorithm to obtain a first initial disparity map set;

performing consistency inspection to pixels in each first initial disparity map in the first initial disparity map set according to a consistency inspection algorithm to obtain an inspection result; and performing labeling processing to each pixel in the each first initial disparity map based on the inspection result to obtain a labeled first disparity map set, wherein the label refers to a consistency label, an inconsistency label, or an occlusion label.

3. The method according to claim 2, wherein the performing optimization processing to each first disparity map in the first disparity map set according to a preset optimization rule to obtain a second disparity map set comprises:

performing meshing processing to each first disparity map in the first disparity map set according to a preset partition rule to obtain a meshed second initial disparity map set;

determining disparity information of each mesh using a corresponding algorithm based on the label carried by the pixels in each mesh in each second initial disparity map in the second initial disparity map set; and adding the disparity information of the each mesh to the corresponding mesh in the each second initial disparity map to obtain a second disparity map set.

4. The method according to claim 3, wherein the determining whether each second disparity map in the second disparity map set has a third disparity map with deep tomography to obtain a first determination result comprises:

determining whether the mesh in each second disparity map in the second disparity map set has a third disparity map with deep tomography to obtain a first determination result;

if the first determination result indicates existence of the third disparity map, the segmenting a portion with deep tomography in the third disparity map to obtain a foreground disparity map and a background disparity map which correspond to the portion with deep tomography in the third disparity map comprises:

if the first determination result indicates existence of the third disparity map, segmenting the mesh with deep tomography in the third disparity map to obtain a foreground disparity map which correspond to the mesh with deep tomography and a background disparity map which correspond to the mesh with deep tomography in the third disparity map;

the mapping the second disparity map without deep tomography, the foreground disparity map, the background disparity map, and the portion without deep tomography in the third disparity map according to a first virtual viewpoint to obtain a first virtual viewpoint image set comprises:

mapping the second disparity map without deep tomography, the foreground disparity map which corresponds to the mesh with deep tomography, the background disparity map which corresponds to the mesh with deep tomography, and the mesh without deep tomography in the third disparity map according to the first virtual viewpoint to obtain a first virtual viewpoint image set.

5. The method according to claim 1, further comprising:
if the first determination result indicates absence of the third disparity map, mapping the each second disparity map as second virtual viewpoint to obtain a second virtual viewpoint map set; and
fusing the second virtual viewpoint images in the second virtual viewpoint image set to obtain a to-be-synthesized viewpoint image.

6. The method according to claim 3, wherein the determining disparity information of each mesh using a corresponding algorithm based on the label carried by the pixels in each mesh in each second initial disparity map in the second initial disparity map set comprises:
if the number of pixels carrying the consistency label within a preset scope outside the first target mesh exceeds a preset threshold, performing fitting processing to the first target mesh according to a plane fitting algorithm to obtain disparity information of the first target mesh;
if the number of pixels carrying the consistency label within a preset scope outside the first target mesh does not exceed the preset threshold, determining a third target mesh with the minimum path cost to the second target mesh according to a dynamic planning algorithm; and
setting disparity information of the third target mesh as the disparity information of the second target mesh.

7. The method according to claim 6, wherein the determining whether each second disparity map in the second disparity map set has a third disparity map with deep tomography to obtain a first determination result comprises:
determining, based on the disparity information of each mesh in the second disparity map, disparity information of meshes at four outer corner points of any mesh in the second disparity map; and
determining whether a third disparity map with a deep tomographic mesh exists based on the disparity information of the meshes at the four outer corner points to obtain a first determining result.

8. An apparatus for synthesizing virtual viewpoint images, comprising:
an acquiring module configured for acquiring an original image set;
a matching module configured for performing stereo matching between original images in the original image set and prestored images to obtain a first disparity map set;
an optimizing module configured for performing optimization processing to each first disparity map in the first disparity map set according to a preset optimization rule to obtain a second disparity map set;

a determining module configured for determining whether each second disparity map in the second disparity map set has a third disparity map with deep tomography to obtain a first determination result;
a segmenting module configured for: if the first determination result indicates existence of the third disparity map, segmenting a portion with deep tomography in the third disparity map to obtain a foreground disparity map and a background disparity map which correspond to the portion with deep tomography in the third disparity map;
a first mapping module configured for mapping, as first virtual viewpoints, the second disparity map without deep tomography, the foreground disparity map, the background disparity map, and the portion without deep tomography in the third disparity map to obtain a first virtual viewpoint image set; and
a fusing module configured for fusing first virtual viewpoint images in the first virtual viewpoint image set to obtain a to-be-synthesized viewpoint image.

9. A device for synthesizing virtual viewpoint images, comprising:
at least one processor; and
a memory in communication connection with the at least one processor; wherein, the memory stores one or more instructions that may be executed by the at least one processor; and
the one or more instructions are executed by the at least one processor, such that the at least one processor is configured for
acquiring an original image set;
performing stereo matching between original images in the original image set and prestored images to obtain a first disparity map set;
performing optimization processing to each first disparity map in the first disparity map set according to a preset optimization rule to obtain a second disparity map set;
determining whether each second disparity map in the second disparity map set has a third disparity map with deep tomography to obtain a first determination result;
if the first determination result indicates existence of the third disparity map, segmenting a portion with deep tomography in the third disparity map to obtain a foreground disparity map and a background disparity map which correspond to the portion with deep tomography in the third disparity map;
mapping the second disparity map without deep tomography, the foreground disparity map, the background disparity map, and the portion without deep tomography in the third disparity map according to a first virtual viewpoint to obtain a first virtual viewpoint image set; and
fusing first virtual viewpoint images in the first virtual viewpoint image set to obtain a to-be-synthesized viewpoint image.

10. A non-transitory computer readable memory medium on which one or more instructions are stored, wherein the one or more instructions, when being executed, are configured for
acquiring an original image set;
performing stereo matching between original images in the original image set and prestored images to obtain a first disparity map set;

performing optimization processing to each first disparity map in the first disparity map set according to a preset optimization rule to obtain a second disparity map set;

determining whether each second disparity map in the second disparity map set has a third disparity map with deep tomography to obtain a first determination result;

if the first determination result indicates existence of the third disparity map, segmenting a portion with deep tomography in the third disparity map to obtain a foreground disparity map and a background disparity map which correspond to the portion with deep tomography in the third disparity map;

mapping the second disparity map without deep tomography, the foreground disparity map, the background disparity map, and the portion without deep tomography in the third disparity map according to a first virtual viewpoint to obtain a first virtual viewpoint image set; and fusing first virtual viewpoint images in the first virtual viewpoint image set to obtain a to-be-synthesized viewpoint image.

11. The device according to claim 9, wherein the performing stereo matching between original images in the original image set and the prestored images to obtain a first disparity map set comprises:

performing stereo matching between original images in the original image set and the prestored images according to a stereo matching algorithm to obtain a first initial disparity map set;

performing consistency inspection to pixels in each first initial disparity map in the first initial disparity map set according to a consistency inspection algorithm to obtain an inspection result; and performing labeling processing to each pixel in the each first initial disparity map based on the inspection result to obtain a labeled first disparity map set, wherein the label refers to a consistency label, an inconsistency label, or an occlusion label.

12. The device according to claim 11, wherein the performing optimization processing to each first disparity map in the first disparity map set according to a preset optimization rule to obtain a second disparity map set comprises:

performing meshing processing to each first disparity map in the first disparity map set according to a preset partition rule to obtain a meshed second initial disparity map set;

determining disparity information of each mesh using a corresponding algorithm based on the label carried by the pixels in each mesh in each second initial disparity map in the second initial disparity map set; and adding the disparity information of the each mesh to the corresponding mesh in the each second initial disparity map to obtain a second disparity map set.

13. The device according to claim 12, wherein the determining whether each second disparity map in the second disparity map set has a third disparity map with deep tomography to obtain a first determination result comprises:

determining whether the mesh in each second disparity map in the second disparity map set has a third disparity map with deep tomography to obtain a first determination result;

if the first determination result indicates existence of the third disparity map, the segmenting a portion with deep tomography in the third disparity map to obtain a foreground disparity map and a background disparity map which correspond to the portion with deep tomography in the third disparity map comprises:

if the first determination result indicates existence of the third disparity map, segmenting the mesh with deep tomography in the third disparity map to obtain a foreground disparity map which correspond to the mesh with deep tomography and a background disparity map which correspond to the mesh with deep tomography in the third disparity map;

the mapping the second disparity map without deep tomography, the foreground disparity map, the background disparity map, and the portion without deep tomography in the third disparity map according to a first virtual viewpoint to obtain a first virtual viewpoint image set comprises:

mapping the second disparity map without deep tomography, the foreground disparity map which corresponds to the mesh with deep tomography, the background disparity map which corresponds to the mesh with deep tomography, and the mesh without deep tomography in the third disparity map according to the first virtual viewpoint to obtain a first virtual viewpoint image set.

14. The device according to claim 9, further comprising:

if the first determination result indicates absence of the third disparity map, mapping the each second disparity map as second virtual viewpoint to obtain a second virtual viewpoint map set; and fusing the second virtual viewpoint images in the second virtual viewpoint image set to obtain a to-be-synthesized viewpoint image.

15. The device according to claim 12, wherein the determining disparity information of each mesh using a corresponding algorithm based on the label carried by the pixels in each mesh in each second initial disparity map in the second initial disparity map set comprises:

if the number of pixels carrying the consistency label within a preset scope outside the first target mesh exceeds a preset threshold, performing fitting processing to the first target mesh according to a plane fitting algorithm to obtain disparity information of the first target mesh;

if the number of pixels carrying the consistency label within a preset scope outside the first target mesh does not exceed the preset threshold, determining a third target mesh with the minimum path cost to the second target mesh according to a dynamic planning algorithm; and setting disparity information of the third target mesh as the disparity information of the second target mesh.

16. The device according to claim 15, wherein the determining whether each second disparity map in the second disparity map set has a third disparity map with deep tomography to obtain a first determination result comprises:

determining, based on the disparity information of each mesh in the second disparity map, disparity information of meshes at four outer corner points of any mesh in the second disparity map; and determining whether a third disparity map with a deep tomographic mesh exists based on the disparity information of the meshes at the four outer corner points to obtain a first determining result.

* * * * *